Figure 1:
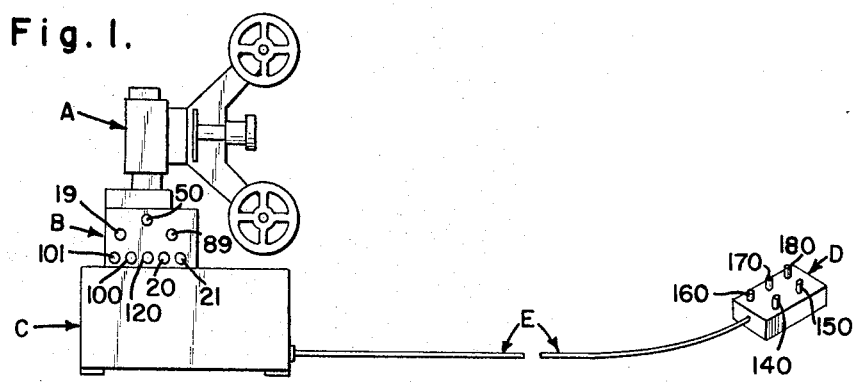

Oct. 11, 1966        R. A. OSWALD        3,278,819

MOTION PICTURE PROJECTOR SPEED CONTROL

Filed Nov. 13, 1963

INVENTOR
Robert A. Oswald
BY
Townsend and Townsend
attorneys

United States Patent Office 3,278,819
Patented Oct. 11, 1966

3,278,819
MOTION PICTURE PROJECTOR SPEED CONTROL
Robert A. Oswald, 5701 W. Adams Blvd.,
Los Angeles, Calif.
Filed Nov. 13, 1963, Ser. No. 323,303
3 Claims. (Cl. 318—257)

This invention relates to a control unit for a motion picture projector.

Normally in policing horse races, motion pictures are taken of an entire race so that the stewards and track judges can review any foul claims. Since this review is usually performed in a darkened room with the judges located remote from the projection booth, it is necessary to provide reliable and simple circuitry which is operable to control the projector from various remote stations. It may be preferable in such cases to review the entire race without stopping or reversing the film the first time through while yet allowing viewers to get a good look at certain questionable portions of the race.

Accordingly it is an object of this invention to provide control circuitry for a motion picture projector in which the projector speed can, at all times, be controlled by an operator stationed at the projector or by track judges or viewers located at remote stations. An advantage of this is that a viewer can slow down the projector in order to closely review certain sections of the film; yet the viewer cannot stop or reverse the film, which acts could disrupt the entire viewing sequences for the other viewers.

Another object of this invention is to provide a speed control unit for a projector in which a fast-control switch and a slow-control switch are connected to energize a servomotor for movement between upper and lower limits. The servomotor output is coupled to an adjustable power source which, in turn, varies the power supplied to the projector motor to thus control the speed of projection operation.

A feature and advantage of this invention resides in the fact that the speed of projector operation can be quickly varied between upper and lower limits without need for manual adjustment.

Still another object is to provide a selector circuit which is operable to over-ride local start, stop, and reversing switches located on the projector with duplicate start, stop, and reversing switches located on a remote control console whereby the projector operator can at any time turn the controls over to the viewers. An advantage of this resides in the fact that the viewers do not have to relay operating commands to an operator but may control the projector directly.

A feature and advantage of this invention resides in the fact that the viewers have control over the projector speed at all times and are able to acquire complete control over the projector operation only when a master selector switch is activated.

Figure 2:
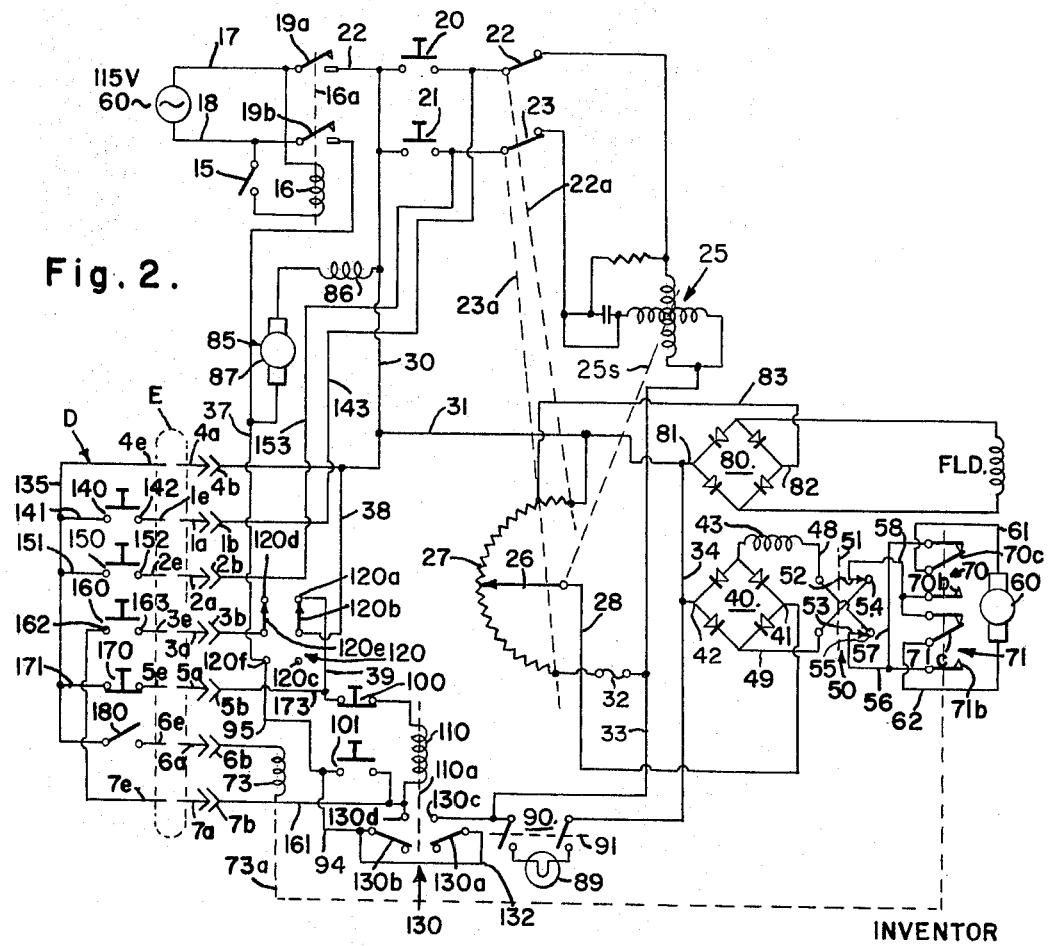

Other objects of this invention will become apparent upon reading the following description of one embodiment of the invention and referring to the drawings in which:

FIG. 1 is a schematic illustration of the one system in which the invention can be used; and FIG. 2 is a wiring diagram of one embodiment of the invention.

As schematically illustrated in FIGURE 1, there is provided a conventional motion picture projector A having a plurality of control switches positioned on a control panel B. A control unit housing C containing a speed control servo unit and appropriate switches and relay circuitry is secured to the bottom of the projector as a support means. A remote control console D is connected in circuit relationship with the control system contained in housing C by means of an extension cable E. By throwing a local-remote control switch 120 on panel B, from a first position to a second position, the control buttons on the projector panel B are effectively switched out of circuit and the control buttons on remote control console D are effectively switched into circuit with the control system.

As illustrated in the wiring diagram of FIGURE 2, the projector circuit can be connected to a standard source of 115 volt, 60 cycle, A.C. current. An on-off switch 15 and associated switching relay 16 are connected across the power input wires 17 and 18. By closing on-off switch 15, current flows through relay coil 16 to pull the relay armature 16a down and close the two switch contacts 19a and 19b thus completing the power supply circuit connection to the projector control system.

For local control of the projector's speed, a pair of normally open push button switches 20 and 21 are connected in circuit to lead 22 from on-off switch contact 19a. As one or the other of speed control switches 20 or 21 is closed, an electrical current is passed through closed upper or lower limit switch 22 or 23 to the windings of servomotor 25 to produce the field which rotates output shaft 25s. As illustrated in the diagram, if speed control switch 20 is closed servomotor output shaft 25s will rotate in a counter-clockwise direction to rotate the mechanically connected wiper arm 26 across the voltage divider windings 27. This movement across the windings produces an increasing voltage signal on an output line 28 which is connected to wiper 26.

In order to apply a voltage across voltage divider windings 27, the ends of the winding are connected across the A.C. input source. The upper end of the winding is connected to on-off switch contact 19a by means of lead 31 and common lead 30. The lower end of winding 27 is connected to on-off switch contact 19b by way of fuse 32, return lead 33 to the start-stop relay contact 130 (when closed), up through leads 94, 95 and 37. Return lead 33 is also connected to the winding of servomotor 22 to complete the circuit across the winding when either of speed control switches 20 or 21 is closed.

The variable voltage output on wiper output lead 28 is fed to full-wave rectifier bridge 40 at junction 41 for conversion to D.C. current having an amplitude proportional to the A.C. input. Junction 42 which is diametrically opposite to input junction 41 is maintained at the reference potential of the A.C. input source by means of the leads 34, 31, 30 and 22 connected to on-off switch contact 19a. All four diodes in the rectifying bridge 40 and choke coil 43 serve to produce a D.C. potential or D.C. signal which is directly proportional to the variable A.C. signal applied across junctions 41 and 42. This D.C. signal is then fed through the current reversing switches 50, 70 and 71 to the projector motor armature 60 for controlling the speed of camera operation as will be explained later.

In order to control the direction of projector motor rotation and thereby the direction of film drive, a double throw current reversing switch 50 is connected in circuit between the full-wave rectifier bridge 40 and projector motor armature 60. By moving the switch arm 51 from a first to a second position, contact blades 52 and 53 are interchanged between the terminals 54 and 55. The variable D.C. output signal from rectifier 40 is thus fed over output leads 48 and 49, through switch blades 52 and 53 and contacts 54 and 55, through the switch contact sets 70 and 71 of the presently deactivated remote reverse relay (to be explained) to armature 60 by means of leads 61 and 62. With reference to contact sets 70 and 71 of the remote reversing relay, the rectified D.C. signal at local current reversing switch terminal 54 is fed through lead 58, to contact arm 71c and lead 62 to the lower end of armature 60. The rectified D.C. signal at local reversing switch contact 55 is fed through leads 56 and 57 to contact arm 70c, to lead 61 and the upper side of armature 60.

A second full-wave rectifying bridge 80 is connected to supply a constant D.C. current to the field windings of the projector motor. One junction 81 of rectifier bridge 80 is connected in common to the A.C. input source by means of leads 31, 30 and 22 connected to input switch contact 19a. A second junction 82, is connected to a non-sliding tap on voltage divider winding 27, by means of lead 83. The A.C. signal impressed across the four diodes of full-wave rectifying bridge 80 produces a D.C. current which causes the winding to set up a magnetic field sufficient to rotate current carrying armature 60. Thus, it can be seen that the projector motor will operate at speeds proportional to the magnitude of the variable D.C. signal applied to armature 60.

A projector lamp 89 is connected in the circuit across the A.C. input source by means of common return lead 33 and by means of common lead 34. The two pole switch 90 is connected in circuit to be manually closed for energizing lamp 89. Thus when the armature 91 of switch 90 is moved rightwardly, both the contact blades complete the circuit through the lamp filament.

In order to selectively start and stop the camera at any given point during the viewing of a film, a normally closed push button stop switch 100 and a normally open push button start switch 101 are connected in circuit between a start-stop relay 110 and the A.C. input source. In the normally closed position, stop switch 100 conducts current from one side of A.C. input source to relay 110 by way of leads 22, 30, 38, and switch blade 120b of local-remote selector switch 120 and to lead 39. The lower end of relay coil 110 is connected to one side of normally open start switch 101. The other terminal of normally open start switch 101 is connected to the A.C. input source by way of lead 95 to terminal 120f of selector switch 120, to lead 37, and the on-off switch contact 19b. Thus, by closing the normally open start switch 101, the circuit to start-stop relay coil 110 is completed and causes the armature 110a to be pulled upward to move the switch contact arms 130a and 130b to the upper position thus completing both a relay holding and power supply return circuit for common lead 33 through the switch contacts 130c, shunt lead 132 to switch arm 130b to upper contacts 130d, and back up to the on-off switch contact 19b along leads 94, 95 and 37. Since this completes the return circuit for the projector motor, lamp 89, and servomotor 22, the projector is rendered operative. In order to stop the projector at any given instant, stop switch 100 is pushed to open the circuitry to the stop-start relay 110, stopping current flow and allowing the contact arms of start-stop switch 130 to drop to their lower position thus breaking the return circuit from the projector motor, lamp, and servomotor.

As a means for preventing the servomotor 22 from overdriving wiper 26 beyond the ends of voltage divider winding 27, limit switches 22 and 23 are mechanically coupled, as illustrated by the dashed lines 22a and 23a, near the upper and lower ends respectively of winding 27. When wiper means 26 approaches the end of the voltage divider windings, limit switch 22 or 23 associated with that end is actuated to open and cut-off current to servomotor 22 and stop its operation. By pushing the normally open button 20 or 21 associated with the opposite end of voltage divider windings 27, servomotor 22 is energized and caused to rotate in the opposite direction to release the mechanical connection and render both speed control switches 20 and 21 operable again.

In order to enable a second operator to regulate the projector from a location distant from the above discussed local controls, a remote control console D having a connecting cable E of a desired length is plugged into the projector circuit. By moving the local-remote selector switch 120 to a lower position, the entire set of remote control switches 140, 150, 160, 170 and 180, which are mounted on the remote control console D, are connected in circuit to by-pass the duplicate control switches mounted on the camera control panel.

By so moving the local-remote selector switch 120 to the remote control position, the switch blades 120b and 120e are moved from the upper contacts 120a and 120d to lower contacts 120c and 120f respectively. Thus, the A.C. input circuit connected to the local start-stop switch is broken while the remote control switches are all connected in circuit.

When jacks 1a through 7a are plugged into the jack receptacles 1b through 7b respectively, a circuit connection is made with on-off input switch contact 19a through common lead 30, receptacle 4b and jack 4a to remote control console common lead 135.

Two normally open remote speed control switches 140 and 150 each have one side connected to common lead 135 by means of lead 141 and 151, respectively. The other side of each remote speed control switch 140 and 150 is connected to shunt the local speed control switch 20 and 21 respectively. Terminal 142 of fast-speed control switch 140 is connected through extension cable to jack 1a and receptacle 1b, lead 143 to the junction beyond switch 20 to the windings of servomotor 25. The slow-speed control switch 150 has its second terminal 152 connected through the extension cable 2e, jack 2a and receptacle 2b, through lead 153 to a junction beyond switch 21 and on to the winding of servomotor 25. Thus actuation of either of normally open remote speed control switches 140 or 150 will set up a magnetic field which causes the armature 25s to rotate, in the same manner as previously discussed with relation to the local-speed control switches 20 and 21.

The local start and stop switches 101 and 100 on the projector control panel are by-passed by remote start and stop switches 160 and 170 respectively only when local-remote selector switch 120 is thrown into the second or lower position. Normally closed remote stop switch 170 is connected in circuit relationship with the upper end of start-stop switching relay 110. One side of remote stop switch 170 is connected to the common power lead 135 by means of lead 171 while the other side is connected through extension cable 5e, jack 5a and receptacle 5b, through lead 173 and stop switch 100 to relay winding 110. Thus, the normally closed local stop switch 100 completes the circuit to one end of the switching relay. The other end of the start-stop relay 110 can be connected across the A.C. input power source by means of the normally open remote start switch 160. The lower end of the start-stop relay 110 is connected to one side of remote start switch 160, by means of lead 161, jack receptacle 7b and jack 7a, and extension cable 7e. When remote start switch 160 is closed across the terminals 162 and 163 the circuit across the A.C. input power source is completed through extension cable 3e, jack 3a and jack receptacle 3b, the now lowered switch arm 120e of local-remote selector switch 120, to contact 120f, common lead 37 and on-off contact 19b. With remote-start switch 160 closed relay 110 is energized and armature 110a is pulled upwardly to pull the switch blade contacts 130a and 130b of the start-stop switch 130 up to thus complete the A.C. power input holding circuit to the lower end of the start-stop relay 110 by means of switch arm 130b and contact 130d to thus hold relay 110 energized after the remote start switch 160 is released. Thus it can be seen that the lower end of relay 110 is connected through switch contact 130d and switch arm 130b up leads 94 and 95 to the lower left-hand terminal 120f of the local-remote selector switch 120, to lead 37 and on-off switch control 19b. Thus, in the same manner as previously discussed for the local start-stop control switches 101 and 100 respectively, the remote start-stop switches 160 and 170 complete the circuit for projector operation.

In order to remotely control the direction of projector motor rotation, a remote forward-reverse switch 180 is included in remote control console D for selectively switching the current reversing switch contact sets 70 and 71 connected between rectifier bridge 40 and projector motor armature 60. For forward drive, remote selector switch 180 is normally open thus maintaining the contact sets 70 and 71 in a position as illustrated. When it is necessary to reverse the direction of film viewing for purposes of reviewing a scene, the switching blade of remote forward-reverse switch 180 is moved to the downward position to close the circuit between the common power lead 135 and remote reverse relay 73. Current flows through extension cable 6e, jack 6a and jack receptacle 6b, to remote-reverse relay coil 73, to return lead 161, through the now-raised contact blade 130b of the energized start-stop relay 110 to the leads 94 and 95 and common lead 37. The armature 73a of remote reversing relay 73 is mechanically coupled to the current reversing switch arms 70c and 71c to move them to a lowermost position in contact with contact points 70b and 71b respectively. Thus, the previously mentioned variable D.C. voltage flows from full wave rectifying bridge 40, through the local reversing switch 50 to lower contacts 70b and 71b of remote current revising switch by way of the switching blades 70c and 71c respectively, and to leads 61 and 62 respectively, to reverse the direction of D.C. current flow to armature 60. Thus, with reversal of D.C. current flow in armature 60, the projector motor reverses its direction to cause the film to be driven in a backward direction and thus enabling the person to review a scene over and over again as many times as he wishes to actuate revise switch 180.

A blower motor 85 is also connected in circuit across the A.C. power input in order to rid the projector of generated heat. This blower motor can be of the type having a conventional series connected field winding 86 and armature 87 which are connected across the two common leads 30 and 37. Thus, as soon as the on-off switch contacts 19a and 19b are closed, blower motor 85 is energized to rotate a blower, forcing air through the projector for carrying away excess heat.

In summary the local-remote selector switch 120 may be placed in its upper position for local control of the projector or it can be thrown into the lower position for remote control. Thus, as the switch blades are moved down, the A.C. power circuit to the local stop switch 100 is broken and the remote start switch 160 is connected in circuit to operate start-stop relay 110. It is therefore possible to stop and start the projector from a remote position.

The normally open local speed control switches 20 and 21 are shunted by the normally open remote speed control switches 140 and 150 so that closing of any speed control switch will result in energization and rotation of servomotor 25. Servomotor output shaft rotation will move wiper arm 26 across the voltage divider 27 to produce a variable amplitude A.C. signal which is rectified at bridge 40 and fed to the projector motor armature 60. This variation in armature current varies the projector motor rotation proportionally and the speed of projector operation.

As a means for controlling the direction of servomotor rotation, from either a local or remote location, manually actuated local current reversing switch 50 and relay actuated remote current reversing switch sets 70 and 71 are connected in circuit between the rectifier bridge 40 and armature 60. This movement of either current reversing switch will reverse current flow through armature 60 and result in a reversal of projector motor rotation.

Although one embodiment of this invention has been illustrated and described, it is understood that various changes may be made in the details, parts, and arrangements without departing from the scope of the invention as limited only by the scope of the appended claims.

What is claimed is:

1. A control system for a motion picture projector of the type having a D.C. film transport motor; said control system comprising first and second A.C. power input terminals, a reversible A.C. servomotor having a forward winding, a reverse winding, and a common connection between one end of each said winding, a first conductor connecting said first input terminal to said common connection, first and second parallel conductors connecting said second input terminal to said forward winding and said reverse winding, said parallel conductors having connected in series therewith switch means for selectively connecting one or the other of said servomotor windings to said second input terminals, first and second normally closed limit switches connected in series with respective said parallel conductors, said servomotor having a shaft, a voltage divider including a wiper arm associated in driven relation to said shaft and a resistance winding having first and second extremities between which said wiper arm is adapted for movement in response to rotation of said servomotor shaft, means connecting said voltage divider winding across said power input terminals so that an A.C. voltage having a magnitude proportional to the rotative position of said servomotor shaft exists at said wiper arm, means for mounting said limit switches adjacent respective extremities of said resistance winding to de-energize said servomotor when said wiper moves to one or the other of the extremities of said resistance winding, means for rectifying the A.C. signal appearing across said wiper and said first resistance winding extremity, means connecting the output of said rectifying means to said film transport motor so that said motor operates at a speed proportional to the position of said wiper established by said servomotor, and means for reversing the polarity of the output of said rectifying means to effect reversal of the direction of film transport.

2. The system of claim 1 in combination with a stop-start switch in series with said first conductor for selectively energizing and de-energizing said system.

3. A control system according to claim 2 in combination with a remote control console having mounted therein switches corresponding to said switch means for selectively connecting said servomotor windings, corresponding to said stop-start switch, and corresponding to said polarity reversing means, a cable including a plurality of conductors extending from said console to said control system, and a local-remote control switch mounted in said control system for selectively connecting the switches in said console in shunt with the corresponding switches in said control system so that said control system can be remotely controlled from said console.

References Cited by the Examiner
UNITED STATES PATENTS

| | | | |
|---|---|---|---|
| 890,458 | 9/1908 | Schley | 318—401 X |
| 2,310,141 | 2/1943 | Willby | 318—546 X |
| 2,060,265 | 8/1952 | Sherrill | 318—401 X |

ORIS L. RADER, *Primary Examiner.*

MILTON O. HIRSHFIELD, *Examiner.*

D. F. DUGGAN, J. C. BERENZWEIG,
*Assistant Examiners.*